Jan. 17, 1967 K. W. MERFELD 3,298,073
GARMENT CLIP
Filed May 18, 1965
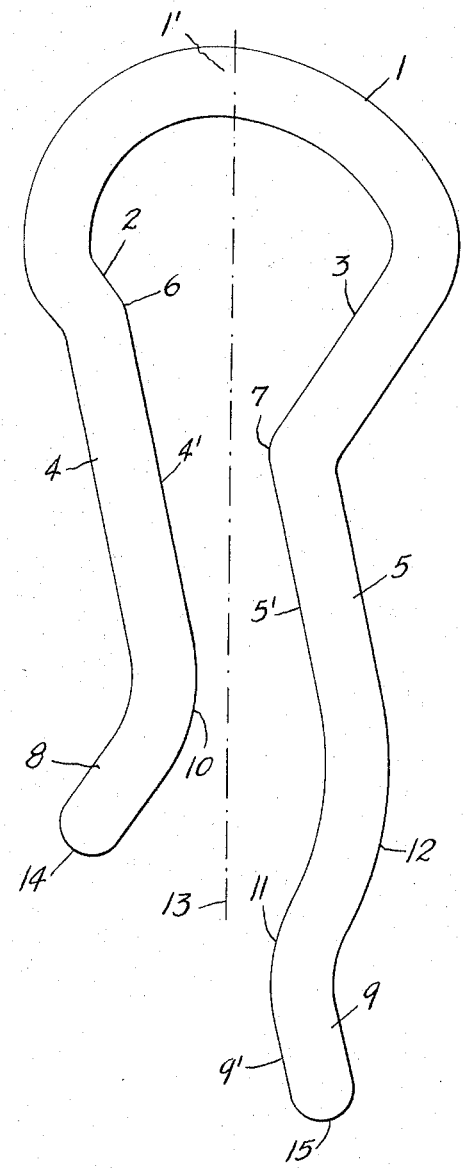
INVENTOR.
KURT W. MERFELD
BY
Howard E. Thompson
ATTORNEY United States Patent Office 3,298,073
Patented Jan. 17, 1967

3,298,073
GARMENT CLIP
Kurt W. Merfeld, Manhasset, N.Y., assignor to Kunreuther and Merfeld, New York, N.Y., a partnership
Filed May 18, 1965, Ser. No. 456,706
5 Claims. (Cl. 24—255)

This invention relates to a clip for use in gripping and holding various types and kinds of garments in the support thereof. More particularly, the invention deals with a clip having an asymmetrical spring loop, from which extends long and short legs in substantially parallel relationship to each other when the clip is not in use, both legs terminating in outwardly flared lips joining the legs in rounded portions.

Still more particularly, the invention deals in a clip of the character described, wherein the legs join the loop in flat portions angularly disposed with respect to the legs and to each other and further, wherein, the apexes between the flat portions and the legs form the primary grippers for engaging the garments or the like. Further, the invention deals with a clip, wherein the leg members are angularly disposed with respect to the substantially longitudinal garment engaging center line of the clip.

The novel features of the invention will be best understood from the following description, when taken together with the accompanying drawing, in which certain embodiments of the invention are disclosed and, in which, the separate parts are designated by suitable reference characters.

The drawing is an extremely large side edge view of a clip made according to my invention.

In the drawing, 1 represents what can be best referred to as an asymmetrical spring loop terminating at its ends in a short flat or straight portion 2 and a longer similar portion 3. Angularly disposed with respect to the portions 2 and 3 are short and long straight leg members 4 and 5, respectively, this structure forming gripper apexes 6 and 7 forming the primary grippers for garments or the like engaged by the clip. The inner surfaces 4' and 5' of the leg members normally are substantially parallel to each other, that is to say, when the clip is in non-engaging position.

The terminal ends of the leg members 4 and 5 have outwardly flared lips 8 and 9 joining the leg members in a rounded portion 10 on the leg member 4 and reversely curved portions 11 and 12 on the member 5.

The leg members 4 and 5 can be referred to as spring members of the clip, being flexible toward and from each other through the spring properties of the loop 1.

With some forms of construction, the upper central portion 1' of the loop will be slightly greater in thickness than the remainder of the clip, this being particularly desirable when the clip is made of plastic material. It will be understood, however, that in other uses of the clip, metal can be employed and, in such uses, the thickness of the material can be the same throughout the various parts of the clip.

By virtue of the cross-sectional contour of the clip as shown, it will be understood that clips of this type and kind can be formed by extruding plastic material and the extruded plastic material can be cut to form the desired widths of the clips. No particular width is illustrated, as these widths are more or less standardized in other clips of the kind under consideration. From this standpoint, it will be apparent that the various parts of the clip would have the same width throughout.

It will be noted that the inner surface 9' of the lip 9 is normally substantially in alinement with and parallel to the inner surface 4' of the leg member 4.

In dot-dash lines I have shown at 13 what could diagrammatically represent the longitudinal center of the garment engagement of the clip and, in mounting the clip on garments, the leg members 4 and 5 will flex laterally in engaging and gripping the garment with the apexes 6 and 7 forming the primary gripper portions of the clip. It will be apparent that, in engaging the clip with a garment or garments, the flared lips 8 and 9 facilitate free passage of the clip over the garment or garments. This operation is further facilitated by the use of the long and short leg members. The lip ends 8 and 9 of the clip are preferably rounded, as seen at 14 and 15, respectively, to avoid injury or marring of the garments in connection with which the clip is used.

Having fully described my invention, what I claim as new and desire to secure by Letters Patent is:

1. A clip of the character described comprising an asymmetrical loop, long and short substantially parallel leg members integrally joining the loop in flat portions angularly disposed with respect to the leg members to form between the same and the leg members gripper apexes, and said leg members terminating in flared lips.

2. A clip as defined in claim 1, wherein the flared lip of the short leg member joins the leg member in a rounded portion.

3. A clip as defined in claim 2, wherein a reversely curved portion joins the flared lip with the long leg member.

4. A clip as defined in claim 1, wherein the flat portion joining the short leg member with the loop is short and angularly disposed with the longer flat portion joining the loop with the long leg member.

5. A clip as defined in claim 1, wherein the leg members are angularly disposed with respect to the longitudinal garment engaging center of the clip.

References Cited by the Examiner
UNITED STATES PATENTS

| | | | |
|---|---|---|---|
| 1,812,536 | 6/1931 | Kovacs | 24—11 |
| 2,711,637 | 6/1955 | Wells | 24—255 X |
| 3,119,163 | 1/1964 | Merfeld | 24—255 |

WILLIAM FELDMAN, *Primary Examiner.*

DONALD A. GRIFFIN, *Examiner.*